(12) United States Patent
Milosavljevic (10) Patent No.: US 9,068,514 B2
(45) Date of Patent: Jun. 30, 2015

(54) METHOD AND ARRANGEMENT FOR INJECTING AN EMULSION INTO A FLAME

(71) Applicant: SIEMENS AKTIENGESELLSCHAFT, München (DE)

(72) Inventor: Vladimir Dusan Milosavljevic, Norrköping (SE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 5 days.

(21) Appl. No.: 14/453,929

(22) Filed: Aug. 7, 2014

(65) Prior Publication Data

US 2014/0338353 A1 Nov. 20, 2014

Related U.S. Application Data

(63) Continuation of application No. 13/825,168, filed as application No. PCT/EP2011/066284 on Sep. 20, 2011, now abandoned.

(30) Foreign Application Priority Data

Sep. 22, 2010 (EP) .................................... 10178255

(51) Int. Cl.
| | |
|---|---|
| *F02C 3/30* | (2006.01) |
| *F23D 11/38* | (2006.01) |
| *F23K 5/12* | (2006.01) |
| *F23R 3/14* | (2006.01) |
| *F23R 3/28* | (2006.01) |
| *F23L 7/00* | (2006.01) |

(Continued)

(52) U.S. Cl.
CPC . *F02C 3/30* (2013.01); *F23D 11/38* (2013.01); *F23D 2900/11101* (2013.01); *F23K 5/12* (2013.01); *F23R 3/346* (2013.01); *F23R 3/14* (2013.01); *F23R 3/286* (2013.01); *F23R 3/343* (2013.01); *F23L 7/002* (2013.01); *F23D 11/16* (2013.01)

(58) Field of Classification Search
USPC .......................... 60/39.59, 746, 748, 776, 806
See application file for complete search history.

(56) References Cited

U.S. PATENT DOCUMENTS

| 4,170,108 A | 10/1979 | Mobsby |
| 4,600,151 A | 7/1986 | Bradley |

(Continued)

FOREIGN PATENT DOCUMENTS

| CN | 1118408 A | 3/1996 |
| CN | 101000145 A | 7/2007 |

(Continued)

*Primary Examiner* — J. Gregory Pickett (57) ABSTRACT

An arrangement for injection of an emulsion of a first fluid and a second fluid into a flame of a burner has a central gas duct, an outer gas channel disposed coaxially with the gas duct, and a fluid channel disposed coaxially between the gas duct and the outer gas channel. The central gas duct and the fluid channel are separated by a first frustoconical wall. The fluid channel and the outer gas channel are separated by a second frustoconical wall. The arrangement is mounted concentrically surrounding a heat source which provides through the gas duct hot gases being directed into the flame of the burner. Further, the arrangement includes a mixing device for forming an emulsion of the first fluid and the second fluid, for supplying the emulsion into the fluid channel and for injecting the emulsion from the fluid channel into the flame.

9 Claims, 4 Drawing Sheets

(51) Int. Cl.
   *F23D 11/16*          (2006.01)
   *F23R 3/34*           (2006.01)

(56)              References Cited

U.S. PATENT DOCUMENTS

| 4,845,940 | A |   | 7/1989 | Beer |   |
|---|---|---|---|---|---|
| 6,021,635 | A |   | 2/2000 | Ras |   |
| 6,132,202 | A | * | 10/2000 | Eroglu et al. | 60/39.59 |
| 6,490,867 | B2 | * | 12/2002 | Braun et al. | 60/776 |
| 7,568,345 | B2 |   | 8/2009 | Furletov |   |
| 2002/0178733 | A1 | * | 12/2002 | Hellat et al. | 60/776 |
| 2004/0088997 | A1 | * | 5/2004 | Hellat et al. | 60/776 |
| 2006/0059915 | A1 |   | 3/2006 | Furletov |   |
| 2014/0096502 | A1 | * | 4/2014 | Karlsson et al. | 60/39.59 |

FOREIGN PATENT DOCUMENTS

| EP | 1331441 A1 | 7/2003 |
|---|---|---|
| EP | 1659339 A1 | 5/2006 |
| EP | 2107310 A1 | 10/2009 |
| EP | 2107313 A1 | 10/2009 |
| GB | 1516177 A | 6/1978 |
| WO | WO 2005040682 A2 | 5/2005 |
| WO | WO 2009121777 A1 | 10/2009 |

* cited by examiner

METHOD AND ARRANGEMENT FOR INJECTING AN EMULSION INTO A FLAME

CROSS REFERENCE TO RELATED APPLICATIONS

This application is a Continuation of U.S. National Stage application Ser. No. 13/825,168 filed Mar. 20, 2013, of international Application No. PCT/EP2011/066284 filed Sep. 20, 2011, and claims the benefits thereof. The International Application claims priority of European Application No. 10178255.5 EP filed Sep. 22, 2010. All of the applications are incorporated by reference herein in their entirety.

TECHNICAL FIELD

The present invention refers to a method and an arrangement for infection of an emulsion into a flame, preferably for use in gas turbine engines, and more particularly to a burner adapted to stabilize engine lean partially premixed (LPP) combustion process and engine turndown requirements, and further to a burner that uses a heat source, such as a pilot combustor, to provide combustion products (radicals and heat) to stabilize a main lean partially premixed combustion process. Particularly, the present invention is directed to a nozzle arrangement and a method of injection of an emulsion of fluids into a main flame in a combustion process.

TECHNICAL BACKGROUND

Gas turbine engines are employed in a variety of applications including electric power generation, military and commercial aviation, pipeline transmission and marine transportation. In a gas turbine engine which operates in LPP mode, fuel and air are provided to a burner chamber where they are mixed and ignited by a flame, thereby initiating combustion. The major problems associated with the combustion process in gas turbine engines, in addition to thermal efficiency and proper mixing of the fuel and the air, are associated to flame stabilization, the elimination of pulsations and noise, and the control of polluting emissions, especially nitrogen oxides (NOx), CO, UHC, smoke and particulate emissions.

In industrial gas turbine engines, which operate in LPP mode, flame temperature is reduced by an addition of more air than required for the combustion process itself. The excess air that is not reacted must be heated during combustion, and as a result flame temperature of the combustion process is reduced (below stoichiometric point) from approximately 2300K to 1800 K and below. This reduction in flame temperature is required in order to significantly reduce NOx emissions. A method shown to be most successful in reducing NOx emissions is to make combustion process so lean that the temperature of the flame is reduced below the temperature at which diatomic Nitrogen and Oxygen (N2 and O2) dissociate and recombine into NO and NO2. Swirl stabilized combustion flows are commonly used in industrial gas turbine engines to stabilize combustion by, as indicated above, developing reverse flow (Swirl Induced Recirculation Zone) about the centreline, whereby the reverse flow returns heat and free radicals back to the incoming un-burnt fuel and air mixture. The heat and free radicals from the previously reacted fuel and air are required to initiate (pyrolyze fuel and initiate chain branching process) and sustain stable combustion of the fresh un-reacted fuel and air mixture. Stable combustion in gas turbine engines requires a cyclic process of combustion producing combustion products that are transported back upstream to initiate the combustion process. A flame front is stabilised in a Shear-Layer of the Swirl Induced Recirculation Zone. Within the Shear-Layer "Local Turbulent Flame Speed of the Air/Fuel Mixture" has to be higher then "Local Air/Fuel Mixture Velocity" and as a result the Flame Front/combustion process can be stabilised.

Document WO 2009/121777 A1 discloses a lean-rich partially premixed low emissions burner for a gas turbine combustor that provides stable ignition and combustion process. This burner operates according to the principle of "supplying" heat and high concentration of free radicals from a pilot combustor exhaust to a main flame burning in a lean premixed air/fuel swirl, whereby a rapid and stable combustion of the main lean premixed flame is supported. The pilot combustor supplies heat and supplements a high concentration of free radicals directly to a forward stagnation point and a shear layer of the main swirl induced recirculation zone, where the main lean premixed flow is mixed with hot gases products of combustion provided by the pilot combustor. This allows a leaner mix and lower temperatures of the main premixed air/fuel swirl combustion that otherwise would not be self-sustaining in swirl stabilized recirculating flows during the operating conditions of the burner. The content of said document is in its entirety incorporated into this description by reference. The prior art, as disclosed in the reference, shows a burner arranged to be fueled with gas fuel.

To reduce the NOx emissions from the combustion of the main flame in a burner of the mentioned type, it is suggested to inject an emulsion of liquid fuel and water into the upstream end of the main flame and thereby decrease the temperature of the main flame. For this purpose an emulsion injection system is needed. Said emulsion could be injected by means of conventional nozzles. Examples of nozzles for similar purposes according to prior art in general are described in U.S. Pat. No. 7,568,345, U.S. Pat. No. 6,021,635 and U.S. Pat. No. 4,600,151.

Figure 1:
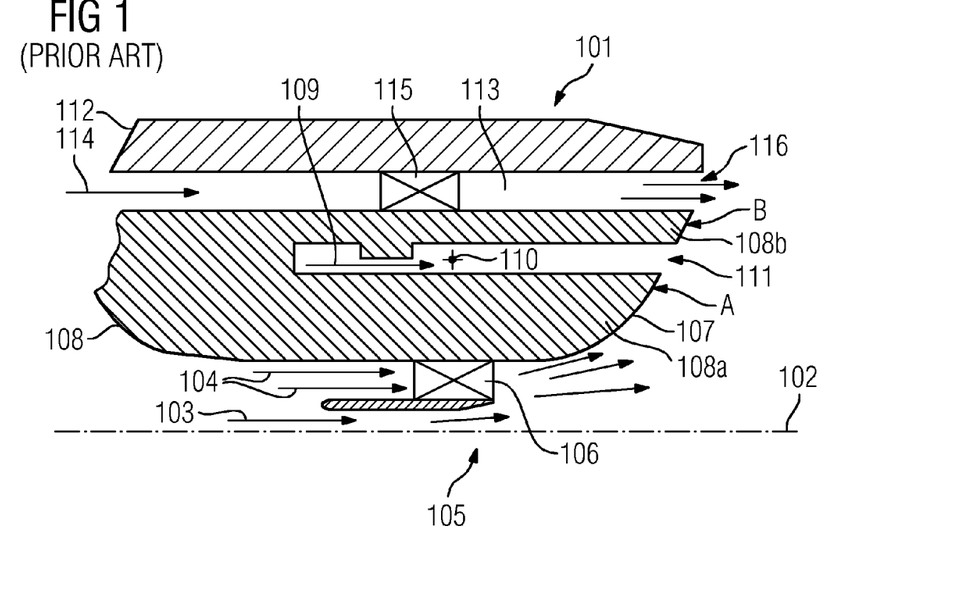
FIG. 1 represents an example of a prior art nozzle arrangement for injection of liquids to flame of a burner in a simplified cross section schematically showing a cross section of a plane through fuel inlet channels of the nozzle.

Techniques of background technology are described here with references to drawings. FIG. 1 presents a drawing of a cross section of the upper half of a prior art annular nozzle. In the figure reference no. 1 represents a symmetrical axis 102 of the nozzle 101. Not gases 103 are flowing downstream along the centre of the nozzle, while inner air 104 sweeps outside an exit 105 of the hot gases 103. Said inner air passes a swirler 106 before leaving the nozzle along an outward curved wall. 107 of a first cylindrical shell 108 of the nozzle 1. Inside the cylindrical shell 108 a liquid 109 or an emulsion of two fluids flows downstream in a first annular channel 110 substantially parallel to the centre axis 102 and leaves the nozzle at an annular orifice 111. A first annular lip portion 108a and a second annular lip portion 108b of the first cylindrical shell are separated by said annular channel 110. A second outer shell 112 terminating in a second lip is arranged concentrically surrounding the first shell 108. A second annular channel 113 is formed between said first shell 108 and said second shell 112. Through this second channel 113 a flow of outer air 114 is flowing in the downstream direction and passes a second swirler 115 before the outer air 114 is discharged in parallel to the centre axis at a mouth 116 of the second channel. According to this prior art technology the inner air 104 is spread as a divergent jet, The inner air will blow the liquid, or emulsion, 109 emerging from the orifice 111 outwards, such that it meets the jet of outer air 114 emerging from mouth 116. The jet of outer air will then disintegrate the liquid/emulsion into droplets and distribute them into the jet.

By this structure of a prior art nozzle the following scheme is valid:

At the inner surfaces of the first 108a and the second 108b annular lip portions, indicated at by positions A and B: The air flow (inner air) will deviate from the surface of the nozzle body, i.e. the first shell, and thereby gives way for carbon to deposit. Some reasons for this are:

- The contact surface over which fuel is flowing is cooled by the fuel (inside first annular channel 110). Due to centrifugal forces a fuel film is formed. Said surface and all metallic components of the injector are usually of equal temperature typically above 350° C. as preheat air at 350° C. for pressures at which the gas turbine engine operates heats said components. As the fuel is at low temperature, just above 15° C., at "normal" day temperature, said "cold" fuel which has high thermal capacity "cools" the surface. The surfaces at A and B will accordingly become cooled. Thereby carbon is allowed to grow at these surfaces at the same time as the cooling limits the ability to allow pyrolysis to ablate carbon away.
- Initial carbon growth at said locations A and B will cause additional air flow separation and provides a chemically preferred surface on the walls at A and B for additional carbon to grow.
- Carbon growth will accelerate very fast after initially being formed.
- The fuel film (or the emulsion film) is not partly generated by a tangential velocity component. Therefore:
  - The atomization of the liquid starts inside the first annular channel 110 already at a point where liquid is ejected.
  - The tangential uniformity of the liquid/emulsion film is determined by nozzle manufacturing tolerances of the gap at the annular orifice 111 formed between the two concentrical annular lip portions 108a and 108b, wherein said lip portions have a diameter much larger than the width of said annular orifice 112.

Due to these reasons the film is not of homogenous thickness. Further:

- Centrifugal force, surface tension or reduction in radius diameter (increase of swirl due to conservation of angular momentum) are the means used for achieving a unity for the film thickness.
- The outer air 114 does not attack the fuel film as the film has already become separated from inner wall, which is a result of the growth of carbon deposits.
- There is no place for the film to become evenly stretched by either inner or outer air flows.
- A high swirl angle of inner air swirler 106 required to attempt to keep the inner air 104 attached to the walls of the first 108a and second 108b inner lip portions. A high inner swirl angle results in low inner air swirler discharge coefficient and reduces air velocity and shear acting on fuel film (while assuming that air doesn't completely separate from the wall of the lip and that a film exists). Separation of inner air is extremely likely from these reasons according to observed carbon deposits under the circumstances.

SUMMARY OF THE INVENTION

The present invention is directed to an arrangement for injection of an emulsion of at least a first fluid and a second fluid into a flame of a burner. Such an arrangement and method can, as an example, be used in a burner for reducing the temperature of a main flame in the combustion process of the burner for the reduction of NOx emissions in the exhaust gases from the burner.

According to the aspects of the invention there is herein presented an arrangement as characterized by the features of the independent apparatus claim.

According to the aspects of the invention there is further presented a method as characterized by the features of the independent method claim.

Further aspects of the invention are presented in the dependent claims.

To arrive at the improved performance of the arrangement and method of the present invention as compared to prior art the structural design of the nozzle and the steps of arriving at the result are outlined as described in the description of embodiments. The structure of the nozzle is designed to improve the atomization of the droplets of the fluids in the emulsion, to accomplish an even and homogenous film of the emulsion and to avoid carbonization of any fluid on the walls of the nozzle arrangement.

According to the provisions provided by means of the invention aspects the process of fuel film break-up process into ligaments and finally droplet spray is enhanced. For fuel film to be formed it is necessary to inject swirl of fuel (emulsion) on the lip, reduce injector diameter to increase swirl (due to conservation of angular momentum) and to allow inner air to attack the fuel film at the surface of the wall adjacent to the fuel film. This will, in turn, determine a final desired film thickness (which can be shown to be directly proportional to atomized fuel droplets SMD (Sauter Mean Diameter) and allow inner air to introduce instability (from air turbulence) which thus results in said desired fuel film break-up.

EMBODIMENTS OF THE INVENTION

In the following a number of embodiments will be described in more detail with references to the enclosed drawings.

The fluids mentioned in relation to the embodiments of the invention are exemplified with a liquid fuel as a first fluid and water as a second fluid.

Figure 2:
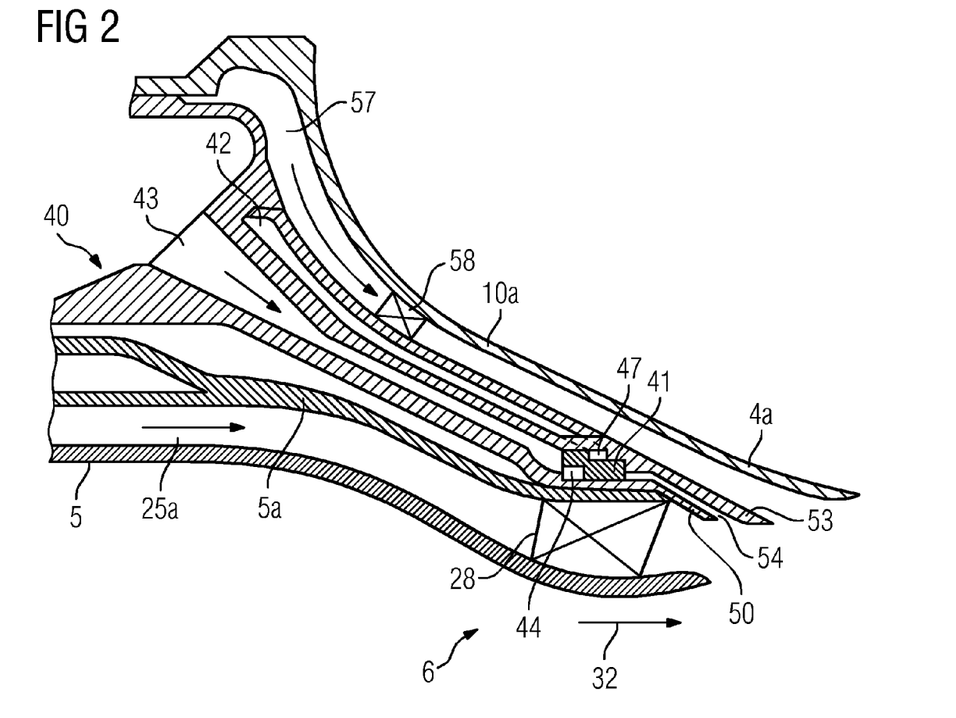
FIG. 2 schematically shows a cross section of the upper half one embodiment of a fuel distributor for distributing an emulsion of two fluids dissolved and atomized to the upstream end of a flame.

One embodiment of the structure of one example of a fuel distributor 40 using the air blast principle of the injection nozzle arrangement according to the aspects of the present invention is depicted in FIG. 2. The drawing is only schematic and shows a cross section, only, along a vertical plane through the centre line of one half, above the centre line, of the annularly formed fuel distributor 40. The fuel distributor 40 is provided with an outer fluid channel 42 for supply of liquid fuel and an inner fluid channel 43 for the supply of a second liquid, such as water. Water and liquid fuel are by use of these channels provided to a mixer 41 for forming an emulsion of the liquid fuel and the water. In the figure the outer fluid channel 43 is visible in the cross section plane, where it is further recognized first cavities 44 of the mixer 41. Said first cavities 44 receive water from the inner fluid channel 43. Liquid fuel is supplied to the outer fuel channels 42 to be conveyed to the mixer 41 into an annular second cavity 47 for receiving said liquid fuel. Said second cavity 47 is separated from the first cavity 44 by means of a circumferential wall. Further reference numbers of members depicted in FIG. 2 are mentioned below.

Figure 3:
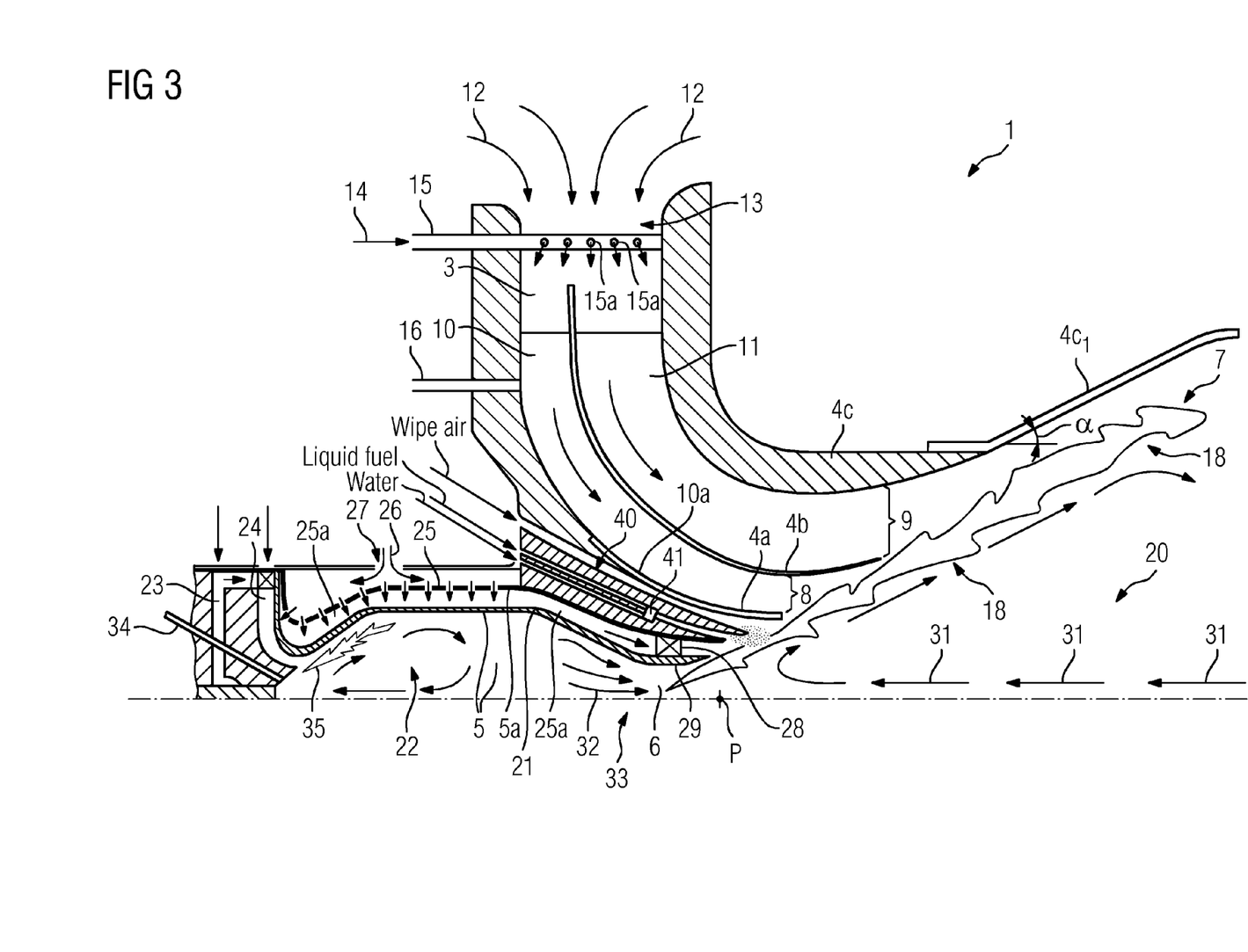
FIG. 3 schematically shows a cross section of a burner, wherein an injection nozzle arrangement according to the aspects of the present invention is used.

FIG. 3 illustrates an embodiment of an LPP burner, wherein a fuel distributor 40 using the air blast principle of the injection nozzle arrangement according to the aspects of the present invention is introduced. Said fuel distributor 40 is depicted as a fuel distributor of a general model and can be internally structured in a preferred manner.

The burner 1 operates according to the principle of "supplying" heat and high concentration of free radicals from the heat source symbolized by the exemplified pilot combustor 5 exhaust 6 to a main flame 7 burning in a lean premixed air/fuel swirl emerging from a first exit 8 of a first lean premixing channel 10 and, in the depicted embodiment, from a second exit 9 of a second lean premixing channel 11, whereby a rapid and stable combustion of the main lean premixed flame 7 is supported. Said first lean premixing channel 10 is formed by and between the walls 4a and 4b of a multi quarl. The second lean premixing channel 11 is formed by and between the walls 4b and 4c of the multi quad. The outermost rotational symmetric wall 4c of the multi quad is provided with an extension $4c_1$ to provide for the optimal length of the multi quarl arrangement. The first 10 and second 11 lean premixing channels are provided with swirler wings forming the swirler 3 to impart rotation to the air/fuel mixture passing through the channels. The heat source represented by the pilot combustor provides hot gases to the main flame. Thereby the exhaust 6 herein represents a gas duct, which hereinafter is indicated as gas duct 6. The hot gas is denoted by 32.

Air 12 is provided to the first 10 and second 11 channels at the inlet 13 of said first and second channels. According to the embodiment shown, the swirler 3 is located close to the inlet 13 of the first and second channels. Further, fuel 14 is introduced to the air/fuel swirl through a tube 15 provided with diffuser holes 15a located at the air 12 inlet 13 between the swirler 3 wings, whereby the fuel is distributed into the air flow through said holes as a spray and effectively mixed with the air flow. Additional fuel can be added through a second tube 16 emerging into the first channel 10.

When the lean premixed air/fuel flow is burnt the main flame 7 is generated. The flame 7 is formed as a conical rotational symmetric shear layer 18 around a main recirculation zone 20. The flame 7 is enclosed inside the extension $4c_1$ of the outermost quart, in this example quarl 4c.

The heat source, herein represented by the pilot combustor 5, supplies heat and supplements a high concentration of free radicals directly to a forward stagnation point P and the shear layer 18 of the main swirl induced recirculation zone 20, where the main lean premixed flow is mixed with hot gases products of combustion provided by the pilot combustor 5. The recirculated gas is denoted by 31 and a pilot flame by number 35.

The pilot combustor 5 is provided with walls 21 enclosing a combustion room for a pilot combustion zone 22. Air is supplied to the combustion room through fuel channel 23 and air channel 24. Around the walls 21 of the pilot combustor 5 there is a distributor plate 25 provided with holes over the surface of the plate. Said distributor plate 25 is separated a certain distance from said walls 21 forming a cooling space layer 25a. Cooling air 26 is taken in through a cooling inlet 27 and meets the outside of said distributor plate 25, whereupon the cooling air 26 is distributed across the walls 21 of the pilot combustor to effectively cool said walls 21. The cooling air 26, now heated to up to 1000 K, is after said cooling let out through a second swirler 28 arranged at a pilot quarl 29 around the pilot combustor 5. For the sake of clarity it should be noted here that the shorter term "pilot" is used for the complete pilot combustor arrangement. Thus, it should be understood that "pilot" includes the pilot combustor 5, the cooling channel 25a, the distributor plate 25, the pilot quarl 29, inlet channels 23, 24 for supplying the pilot combustor with fuel and air, and a pilot shell 5a housing said members of the pilot combustor arrangement. Thus the pilot can in its entirety be referred to by use of reference sign 5a.

In a burner of the type discussed above liquid fuel can be supplied to the main flame 7. This is arranged by introducing a fuel distributor 40 enveloping the downstream part of the pilot 5a, or expressed in another way, enveloping the shell 5a of the pilot combustor 5 at its exit 6. Outside and surrounding the fuel distributor 40 is the inner wall 10a of the first lean premixing channel 10.

Figure 4:
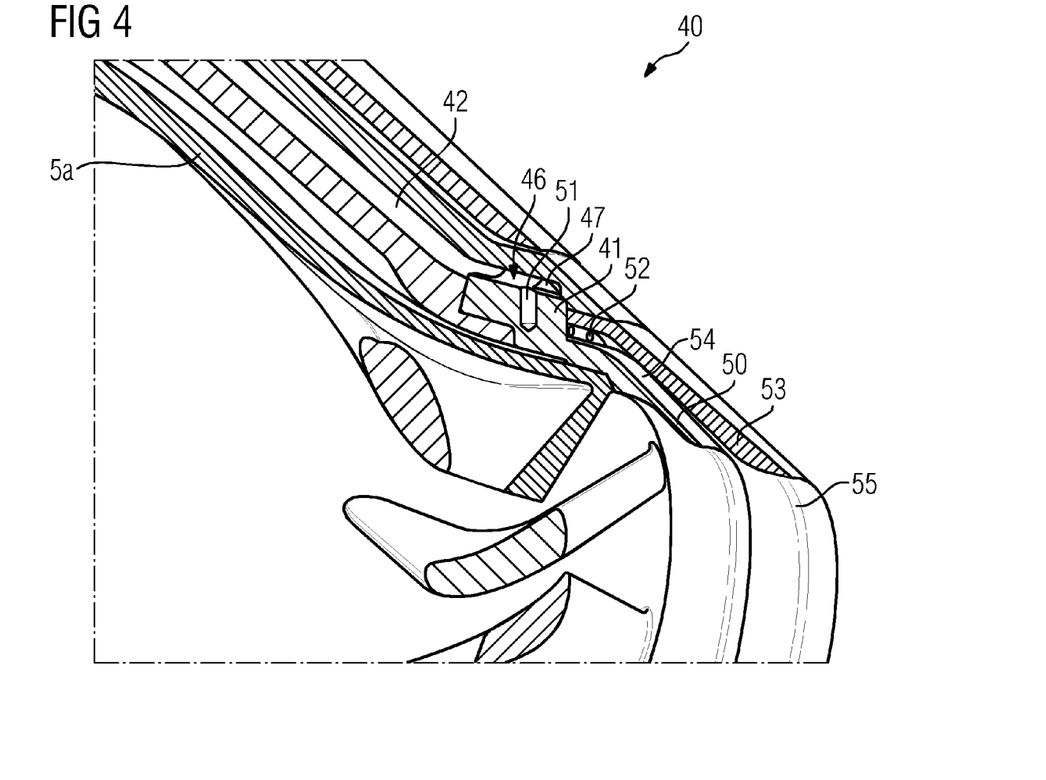
FIG. 4 shows a 3D view of a downstream section of an embodiment of an injection nozzle arrangement according to one aspect of the present invention in a cross section of a plane through fuel inlet channels.

From FIG. 4 it can be understood that the annular fuel distributor channel 54, also referred to as "the fluid channel" 54, between the annular inner lip 50 and the annular outer lip 53 of the fuel distributor 40 is arranged just outside the pilot cooling air channel 25a (FIG. 2). Said pilot cooling air 25b in channel 25a has been heated to around 1000 K after the passage along the shell of the pilot combustor 5. The pilot cooling air 25b is thus sweeping by the outlet of the fuel distributor annular channel 54 and threes the fuel/water emulsion flow 56a towards the rounded end 55 of the inner surface of the annularly formed outer lip 53 of the fuel distributor 40.

Figure 5A:
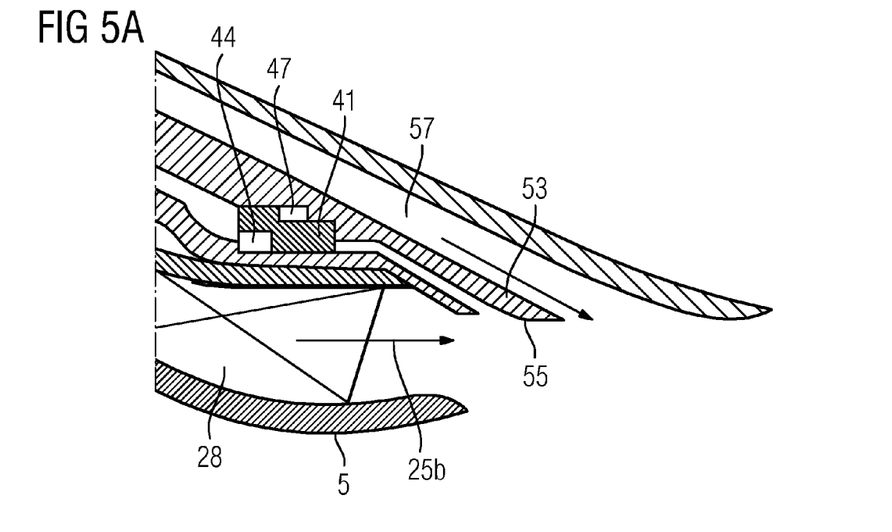
FIGS. 5a and 5b shows more in detail the formation of the emulsion film in one embodiment of mixing devices.
Figure 5B:
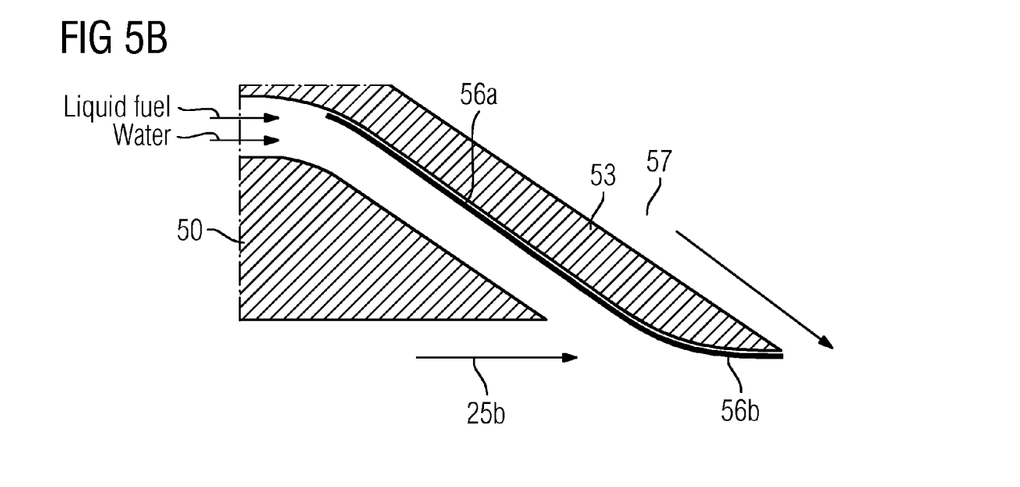

The pressure from the pilot cooling air 25b forces the fuel/water-emulsion flow 56a to form a fuel/water emulsion film 56b along the wall of said outer lip 53. The description of the principle for forming said fuel water emulsion film 56b can more easily be understood from FIGS. 5a and 5b, wherein the most downstream parts of the fuel distributor 40 are schematically depicted by a cross section in a vertical, plane through the symmetry axis of the fuel distributor. Another channel, an air channel 57, hereinafter called "wipe air channel 57" (the name "wipe air" taken from the similarity with a car wiper) or referred to as outer gas channel 57, supplied with air from an inlet, is arranged as an annular space between the fuel distributor 40 and the neighboring inner wall 10a of the first air channel 10 for the supply of air to the main flame 7. Said wipe air 57 wipes off, together with the inner air, the fuel/water emulsion film 56b passing over the edge of outer lip 53 of the fuel distributor. The two flows (wipe air flow 57 and fuel/water emulsion film 56b) meet and the fuel film is squeezed between them. By use of the wipe air 57 flow and inner air 25a the emulsion film 56b is effectively disintegrated from film into ligaments and into fine droplets, where the droplet sizes of water and fuel, respectively are atomized into droplets of small and approximately same sizes. The atomized liquid fuel and water are transported by the wipe air 57 and the pilot cooling air 25b, into the upstream end of the main flame 7 close to the forward stagnation point P, when used in the exemplified burner of FIG. 3. The purpose of the wipe air is to position atomized liquid emulsion into the shear layer of the main RZ. In this way the temperature of the flame will be reduced to about 1600 K.

Figure 6:
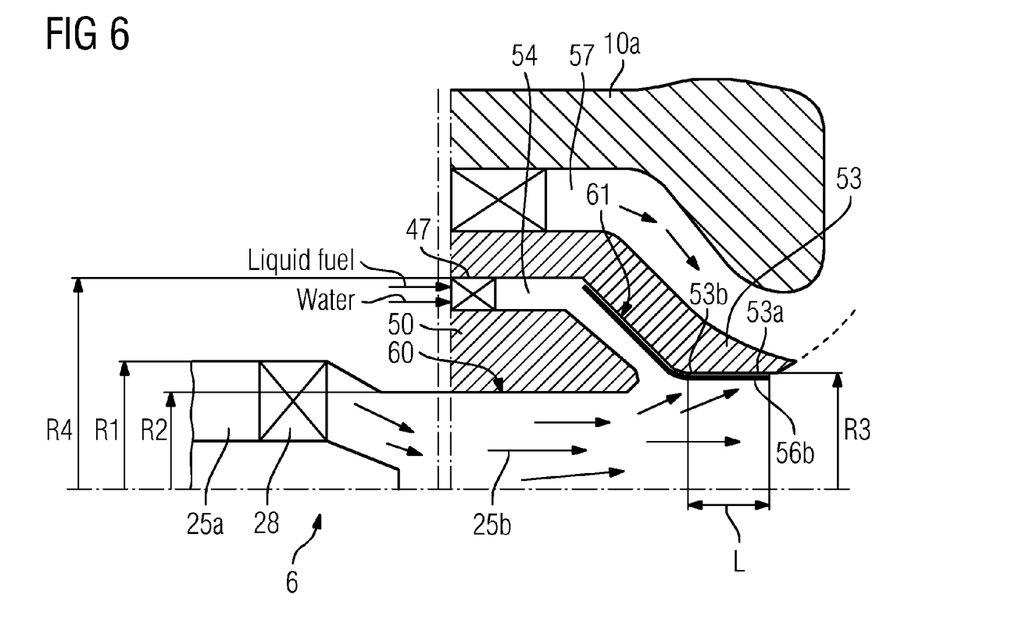
FIG. 6 illustrates aspects of the principle of the air blast principle according to the invention and details of the design.

The principles and the advantages and improvements of the injection nozzle arrangement according to the aspects of the invention with respect to prior art are discussed more in detail with reference to FIG. 6. The most downstream parts of the nozzle arrangement according to the invention are schematically illustrated in FIG. 6, where said parts correspond to the corresponding parts of the equally named parts of the fuel distributor 40 discussed above.

In the nozzle arrangement according to the invention, some conditions should prevail. Thus, the spinning film radius, i.e. the outer radius of the second frustoconical wall 61 (where the second frustoconical wall is the inner surface of the second annular lip 53) surrounding the channel of the mix of the at least two fluids (in the previous embodiments called the fuel distributor channel 54) should be decreased from a wide radius R4 to a narrow radius R3. This narrow radius R3 is reduced almost to the level of the inner radius R2 being the radius of the most narrow opening of the first frustoconical wall 60 (where the first frustoconical wall is the inner surface of the first annular lip 50). Thus R3 should be slightly greater than R2 to implement a forward step at the outlet of the annular inner lip 50. Preferably, the radius R3 should not be larger than 1.1×R2. Still, the distance R3-R2 can be very small and arranged within possible mechanical tolerances from R2 to R3 such that a forward step is formed (in the direction of flow). The gap between the first 50 and second 53 annular lips should be large enough so that the fuel/water emulsion is not squeezed through the gap. At the exit of said gap swirling fuel/water emulsion forms a film, whereby the gap thickness should be larger than the thickness of the fuel/water emulsion film 56b. The transition piece 53b shall have a smooth radius so that liquid fuel/water emulsion does not separate from the wall 61. In this way the tangential velocity of the emulsion is increased, which provides a more uniform and smooth emulsion film distribution.

The arrangement further includes an inner air channel 25a provided between said gas duct for said hot gases from the heat source and said first frustoconical wall 60. In said inner air channel 25a a first swirler 28 for said inner air is mounted. Said first swirler 28 is mounted inside and encircled by said first frustoconical wall 60 at a location upstream of said annular inner lip 50, the radius of the frustoconical wall 60 at said location being R1, and R1 being greater than R1 (FIG. 6). In the example of the burner described above, said inner air channel 25a corresponds to the channel providing cooling air 25b to cool the pilot combustor, which in said example fulfills the role of supplier of hot gases to the main flame of the burner.

The decrease of flow area accomplished by means of arranging R1 to be greater than R2 entails that the velocity of the flow of inner air is accelerated, thereby creating a moderated pressure drop which prevents air flow separation from the neighboring frustoconical walls 60, 61 and formation of carbon deposits on the walls of the outer annular lip 53.

The annular outer lip 53 of said second frustoconical wall 61 has a cylindrical portion of length L, extending substantially in the axial direction. The length L should be as long as needed but preferably not longer than 0.1×R3.

An outer gas channel is provided with a second swirler for providing a swirled flow of wipe air being used for disintegrating the emulsion film 56b when it leaves the outer lip of the second frustoconical wall. Said outer channel corresponds to the channel for wipe air 57 in the above described example of a burner.

The length L of the portion of the outer annular lip 53 is critical for the necessary acceleration of the emulsion film 56b along the inner surface of the outer annular lip and for an energy transfer from the swirling inner air to the emulsion film. By this provided "length L"-portion the emulsion film is "attacked" by the flow of inner air while still being kept to the film formation surface along the inner surface of second frustoconical wall 61. Said attack of inner air on the emulsion film 56b generates high frequency (HF) instabilities and shear in the emulsion film, and as a result said generated instabilities:

- determine spray characteristics and mean droplets size of the emulsion film disintegrated by the inner air and wipe air in combination.
- accomplish a high velocity, without expansion, of the inner air, whereupon shear between the emulsion film and inner air is maximized.

The structural arrangement of the outer annular lip as sketched above is further characterized by allowing the wipe air to flow out from the wipe air channel along the outer surface of the outer annular lip as close as possible to the location where the emulsion film 56b leaves the outer annular lip. To ensure this to happen an outermost portion of the inner surface of the outer annular lip downstream the cylindrical portion with length L should be shaped as a sharp edge. Said outermost portion can be inclined an angle outwards in relation to the centre axis and in that case being as short as possible and further being straight or curved. Due to this design rules:

- the locations for carbon deposits to grow on the walls of the injection device are greatly limited.
- the emulsion film is sandwiched between high velocity inner air and the stream of wipe air.
- the amplitude of wave instability in the emulsion film is allowed to grow, as the emulsion film is squeezed between said two air streams, and as the emulsion film is not supported by a film formation surface.

The inner air swirler 28 should preferably be located on as large diameter as possible to ensure both swirl strength and discharge coefficient. This is confirmed above by the statement that R1 should be greater than R2.

What is claimed is:

1. An arrangement for injection of an emulsion of a first fluid and a second fluid into a flame of a burner, comprising:
    a central gas duct extending along a longitudinal central axis from an upstream end to a downstream end,
    an outer gas channel disposed coaxially with the gas duct,
    a fluid channel disposed coaxially between the gas duct and the outer gas channel, wherein the fluid channel forms a downstream contracting annular fluid channel,
        wherein the central gas duct and the fluid channel are separated by a first frustoconical wall which, at a downstream end, terminates with an annular inner lip,
        wherein the fluid channel and the outer gas channel are separated by a second frustoconical wall, which, at a downstream end, terminates with an annular outer lip,
        wherein the arrangement is mounted concentrically surrounding a heat source which provides through the central gas duct hot gases being directed into a flame of a burner, and
    a mixing device for forming an emulsion of a first fluid and a second fluid, for supplying the emulsion into the downstream contracting annular fluid channel and for injecting the emulsion from the fluid channel into the flame.

2. The arrangement according to claim 1,
    wherein the second frustoconical wall has
        at an outlet from the mixing device into the downstream contracting annular fluid channel an inner radius R4 and
        at the annular outer lip of the second frustoconical wall an inner radius R3,1 wherein the first frustoconical wall has a most narrow opening radius R2, and wherein the fluid channel has a reduced radius in a downstream direction from radius R4 decreasing to radius R3, wherein radius R3 is not larger than 1.1×R2.

3. The arrangement according to claim 2, wherein a difference R3-R2 is as small as allowed by mechanical tolerances to form a widening step from the first annular lip to the second annular lip.

4. The arrangement according to claim 2, wherein a gap between the first and second annular lips are large enough so that a fuel/water emulsion is not squeezed through the gap, whereby the thickness of the gap is larger than a thickness of a fuel/water emulsion film.

5. The arrangement according to claim 2, wherein the annular outer lip of the second frustoconical wall has a cylindrical portion of a length L extending substantially in an axial direction, wherein the length L is not longer than 0.1×R3.

6. The arrangement according to claim 5, wherein an inner surface of the second frustoconical wall has a transition piece adjoining the cylindrical portion of the length L, wherein a surface of the transition piece is curved in a longitudinal cross section with a smooth curve.

7. The arrangement according to claim 6, wherein the arrangement further comprising:
an inner air channel located between the gas duct for hot gases provided by the heat source and the first frustoconical wall,
a first swirler arranged in the inner air channel for inner air,
wherein the first swirler is mounted inside and encircled by the first frustoconical wall at a location upstream of the annular inner lip, and
wherein a radius of the first frustoconical wall at the location upstream of the annular inner lip is R1, wherein R1 is greater than R2.

8. The arrangement according to claim 7, wherein the outer gas channel comprises a second swirler for providing a swirled flow of wipe air being used for disintegrating the emulsion film when the emulsion film leaves an outer lip of the second annular lip.

9. A method for injecting an emulsion of a first fluid and a second fluid into a flame of a burner, wherein the burner comprises:
a central gas duct extending along a longitudinal central axis from an upstream end to a downstream end,
an outer gas channel disposed coaxially with the gas duct,
a fluid channel disposed coaxially between the gas duct and the outer gas channel forming a downstream contracting annular fluid channel,
wherein the central gas duct and the fluid channel are separated by a first frustoconical wall, which, at a downstream end, terminates with an annular inner lip,
wherein the fluid channel and the outer gas channel are separated by a second frustoconical wall, which, at a downstream end, terminates with an annular outer lip,
wherein the arrangement is mounted concentrically surrounding a heat source which provides, through the central gas duct, hot gases into a flame of a burner,
the method comprising:
introducing a mixture of first and second fluids into the fluid channel,
swirling the mixture of the first and second fluids,
decreasing a radius of a swirl of the first and second fluids when they meet the second frustoconical wall, thereby forming an emulsion film along the second frustoconical wall,
sweeping a flow of swirling inner air along an inside of the emulsion film flowing along an inside of the second frustoconical wall,
sweeping a flow of swirling outer air from the outer gas channel along an outside of the emulsion film when the emulsion film leaves the outer annular lip, and disintegrating the emulsion film by the inner air and the outer air when they meet the emulsion film downstream of the outer lip.

* * * * *